WESLEY P. KLIEWER
INVENTOR
Huebner + Worrel
ATTORNEYS

WESLEY P. KLIEWER
INVENTOR

Huebner & Worrel
ATTORNEYS

WESLEY P. KLIEWER
INVENTOR
Huebner & Worrel
ATTORNEYS

March 11, 1969 W. P. KLIEWER 3,432,017

ACTUATION DEVICE CONTROLLED BY DEFORMABLE KEY HAVING END-TO-END CONFORMITY

Filed July 13, 1967

Sheet 4 of 8

WESLEY P. KLIEWER
INVENTOR

Huebner & Worrel
ATTORNEYS

WESLEY P. KLIEWER
INVENTOR

Huebner & Worrel
ATTORNEYS

WESLEY P. KLIEWER
INVENTOR

Huebner & Worrel
ATTORNEYS

WESLEY P. KLIEWER
INVENTOR
Huebner & Worrel
ATTORNEYS

WESLEY P. KLIEWER
INVENTOR
Huebner & Worrel
ATTORNEYS

United States Patent Office 3,432,017

Patented Mar. 11, 1969

3,432,017

ACTUATION DEVICE CONTROLLED BY DEFORMABLE KEY HAVING END-TO-END CONFORMITY

Wesley P. Kliewer, 712 Dickran Drive, Tulare, Calif. 93274

Filed July 13, 1967, Ser. No. 653,053
U.S. Cl. 194—4 21 Claims
Int. Cl. G07f 1/06

ABSTRACT OF THE DISCLOSURE

An acutation device including configuration testing mechanisms and magnetic gates for denying entrance to a counterfeit key but responsive to the insertion of a legitimate key of uniform end-to-end configuration for actuating a vending machine to dispense an item, the device cutting off or consuming a portion of the key commensurate with the price of the item. The device has provision for pushing in any remaining unspent portion of the key toward the purchase of an item and utilizes the key cutoff blades to block the inner workings of the device against a non-legitimate key and probing with unauthorized objects and, in a modified form, is operable to actuate any one of a plurality of vending machines to provide the customer with a variety of choice.

CROSS-REFERENCE TO RELATED APPLICATION

This application is related to applicant's United States Patent No. 3,344,897, granted Oct. 3, 1967.

BACKGROUND OF INVENTION

The present invention relates to actuation devices for vending machines and more particularly to an actuation device for delivery of items, be they goods or services, from vending machines without the use of coins by utilizing a deformable or alterable key, a length of which is spent or consumed each time a purchase is made, the key being of uniform cross-section throughout its length so that all of it may eventually be spent for the purchase of items vended.

Vending systems have been proposed which employ a deformable or consumable key for effecting delivery of an item. However, the key employed has a handle portion which results in an unusable or unspendable remnant. And even though additional length may be provided to compensate for the unspendable remnant, the customer may be left with the impression that he has not received full value and feels he is being cheated. But to provide unspendable key remnant redemption facilities and services, manned or automatic, would be a major and costly task because of the difficulty of keeping even pennies available and since "breaking a nickel" would almost inevitably result in an unspendable remnant, the problem of coin procurement and disbursement would become intolerable and involve the use of time and effort for which there is no practical way to recover the costs of, in effect, selling coins. To avoid this, vending machine operators would tend to price in five-cent increments, thus negating, in actual practice, one of the principal advantages claimed for the consumable key concept.

SUMMARY OF THE INVENTION

It is therefore an object of the present invention to provide a vending machine actuation device which is responsive to a legitimate or authentic deformable or consumable key of uniform end-to-end configuration, and without an unspendable handle, in order that all of the key may be used toward the purchase of items vended, leaving no unspent remnant.

Another object is the provision of a deformable or consumable key for use in the actuation device which is of uniform cross-sectional configuration throughout its length and possesses other characteristics making it difficult to counterfeit, yet is manufactured in an economical and facile manner and provides for ease and convenience in the handling and vending thereof.

A further object is to provide an actuation device having a mechanism for pushing in a key remnant beyond the keyhole entrance to effect a purchase and retracting any remainder thereafter, or retracting the remnant if of insufficient length to effect the purchase, or following the remnant with another key to complete the purchase.

Still another object is to provide a key deforming or altering mechanism in the actuation device which functions in the at rest condition of the device to prevent the insertion of a non-legitimate key and experimental probing with wires, pins and other unauthorized objects, thus rendering the device substantially tamper-proof.

A still further object is the provision of an actuation device by which any one of several vending machines dispensing a variety of items may be actuated and has a mechanism settable at the option of the customer for selecting the item to be dispensed, thereby providing a variety of choice and enabling one actuation device to operate several vending machines.

These and other objects and advantages are achieved by the present invention which contemplates and is concerned with an actuation device having apertures of particular configuration and magnetic gates for testing and accepting only an authentic or legitimate deformable key and is arranged with a key altering mechanism which performs the triple role of key severance, device protection and prevention of the use of an authorized key or object, the legitimate key also having a uniform cross-section throughout its length and the device including a mechanism for pushing in any unspent key remnant and retracting it if insufficient to effect a purchase, or following the remnant with another key, in order that all parts of the key may be spent. In a modified form of the device, provision is made for selection among a multiplicity of items in order to provide the customer with a variety of choice, unlimited by price variation considerations, as is the case with coin operated vending machines.

DESCRIPTION OF THE EMBODIMENTS

*First form*

Figure 2:
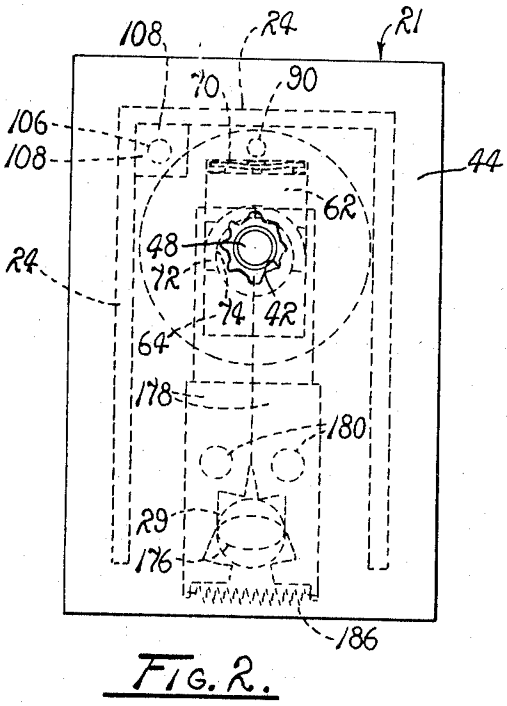
FIG. 2 is a front elevation of the device of FIG. 1.
Figure 1:
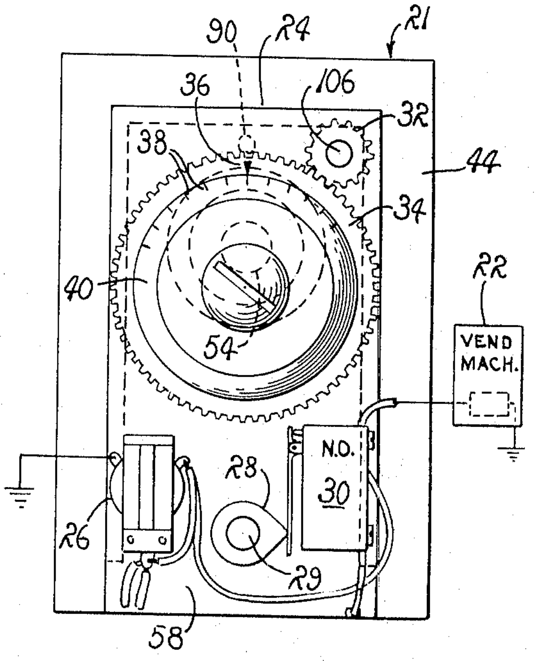
FIG. 1 is a rear elevation of a handleless key-controlled vending machine actuation device embodying the principles of the present invention.
Figure 3:
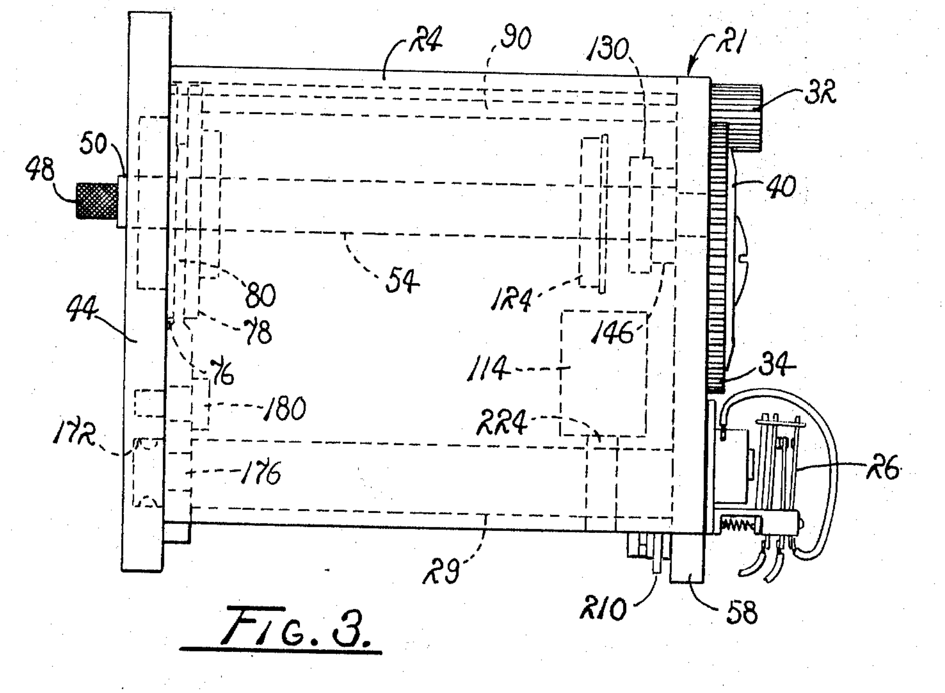
FIG. 3 is a side elevation of the device of FIG. 1.

Referring now to the drawings, there is shown in FIGS. 1 and 2 an actuation device, designated generally by reference numeral 21, which is controlled by a handleless, deformable key and serves to actuate a vending machine 22. As seen in FIG. 1, the actuation device 21 includes a housing 24 on the rear of which is mounted a relay 26, an adjustable cam 28 on a drive shaft 29, a normally open switch 30 connected to the vending machine 22, and price setting controls including a knob 32 meshing with an idler disc 34 bearing a pointer 36 settable by the knob at any desired price indicia 38 on a calibrated stationary disc 40. The inner workings of the actuation device, hereinafter described, are responsive to the insertion of a key, having the proper configuration and characteristics, through a keyhole 42 (FIG. 2) in a front wall or panel 44 of the housing 24 for actuating cam 28 and closing switch 30 to cause the vending machine 22 to dispense an item, be it an article or a service.

Figure 4:
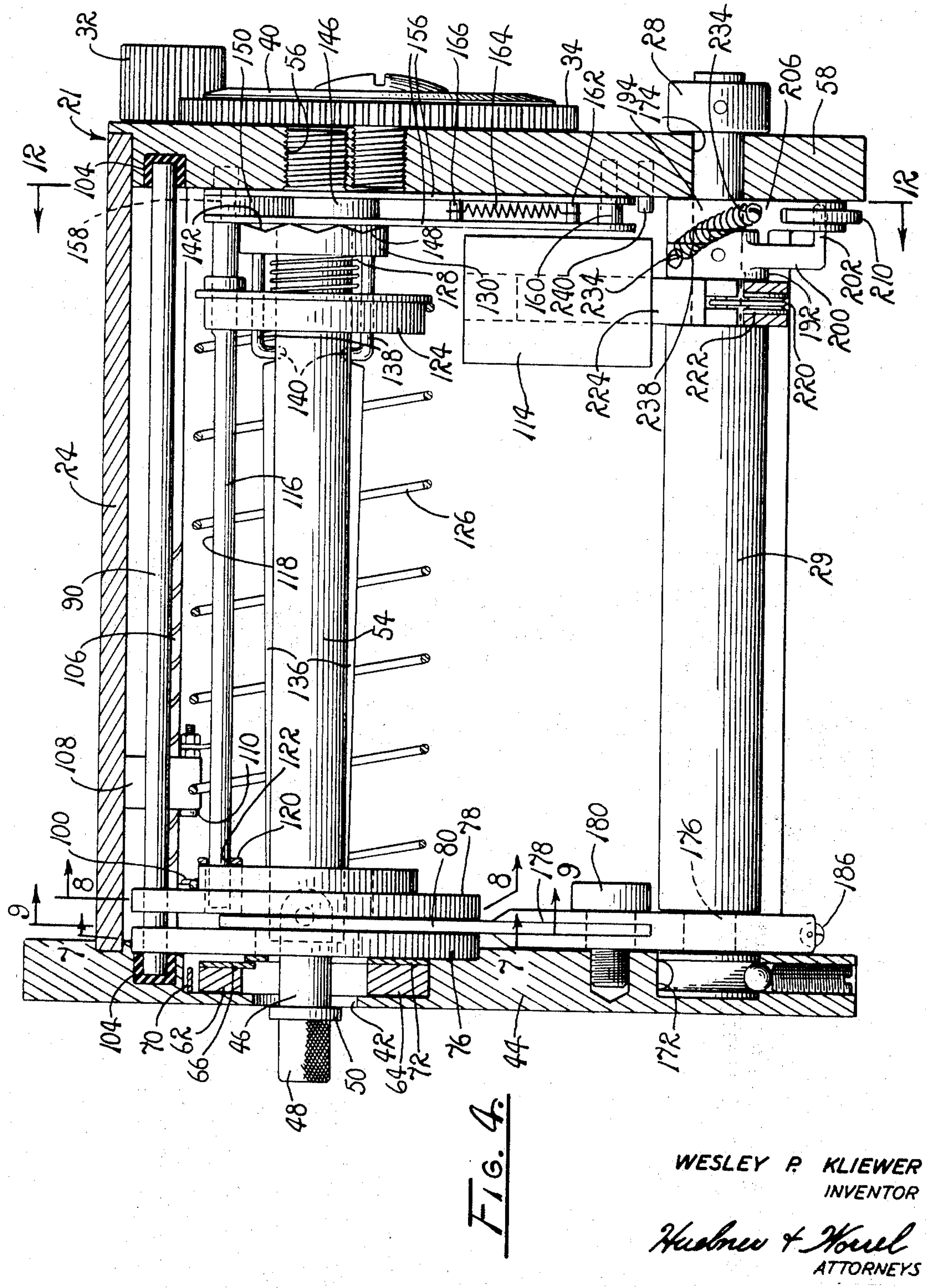
FIG. 4 is a longitudinal vertical section, on a larger scale, of the device of FIG. 1.
Figures 5, 6, 10, 11:
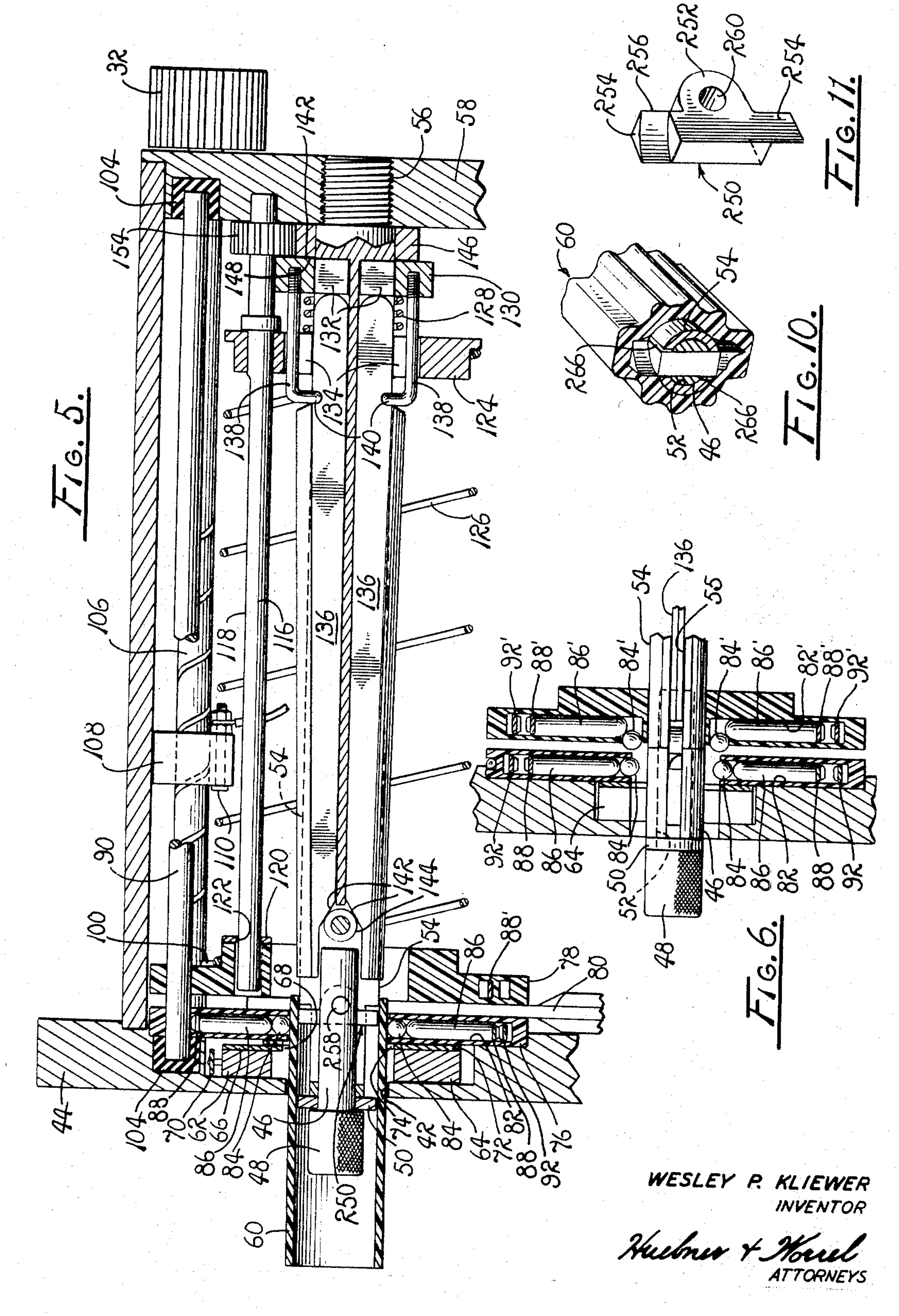
FIG. 5 is a fragmentary sectional view, on a still larger scale, of the upper portion of FIG. 4, some parts being omitted or broken away and showing a key partially inserted.
FIG. 6 is a fragmentary sectional view of a portion of FIG. 5 showing a pair of circuit control plates prior to insertion of a key, the section being on a plane 45° away from that of FIG. 5.
FIG. 10 is a perspective view of the mechanism for advancing a small remaining end of the handleless key beyond the keyhole entrance.
FIG. 11 is a perspective view of a bladed member forming part of the mechanism of FIG. 10.

Turning now to FIGS. 4 and 5, disposed in keyhole 42 is a slidable shaft 46 of a mechanism for pushing and retracting the key, as will later appear, the outer end of the shaft having a knurled control knob 48 and collar or washer 50 thereon and the inner portion thereof being disposed in a bore 52 formed in the front end of an elongated mandrel 54, diametrically slotted as at 55, the rear end of which is secured, as at 56, in a rear wall 58 of housing 24 in alignment with the keyhole.

Keyhole 42 is formed with a characteristic configuration or shape and constitutes the first test of the authenticity or legitimacy of the key which may be configured with internal and/or external variations. It will be appreciated that the accurate duplication of a hollow key with internal variations is far more difficult than a two-side surface and that the configurations of the keys may be greatly varied to render them exceedingly difficult to counterfeit. In the present instance, a key having the same cross-sectional configuration throughout its length is preferred in order that the entire key may be used toward the purchase of items being vended and the tail end or remnant of one key may be followed by another authentic key of like configuration. This is unique and of major importance in that, as hereinbefore stated, it eliminates the necessity for providing key remnant redemption facilities and services which would be a major and costly matter and tends toward pricing in five-cent increments so as to negate, in actual practice, one of the principal advantages claimed for the consumable key concept. Moreover, the production of the keys is greatly simplified and the cost significantly lowered by the fact that there is no end-to-end variation in size or shape as would be the case if an unspendable handle were required. Uninterrupted, straight-line extrusion, with all its simplicity, efficiency and economy, can be used to form the key and there is no waste of material for forming a handle which would only be discarded after the spendable portion of the key has been removed. Another substantial benefit is the ease and convenience with which such keys can be racked, stacked, wrapped, packaged and counted, as opposed to keys with handles. Also, since automatic dispensing of the keys is anticipated, the end-to-end conformity will greatly simplify the loading procedure and dispensing mechanism, with no space being taken up by essentially useless handles.

Additional to its configuration, an authentic key 60 is fabricated of a substantially rigid but deformable material, such as plastic or the like, which contains or is loaded with a predetermined concentration of magnetic or magnetically responsive particles for the purpose of influencing magnetic gates which constitute the second test of key legitimacy. Thus, upon insertion of key 60 into keyhole 42 the front end of the key passes between a pair of magnets 62 and 64, one above and the other below the keyhole, mounted for sliding movement in front panel 44 (FIGS. 4 and 5). Secured to magnet 62, for sliding therewith, is a plate or gate 66 with a U-shaped notch 68 (FIG. 2) in the lower edge thereof sufficiently oversize to accommodate passage of the key when the magnet is in the position shown in FIGS. 4 and 5, in which position it is normally maintained by a spring 70. Magnet 64 also has a plate or gate 72 secured thereto but it is provided with an opening 74 (FIG. 2) which is sufficiently oversize to pass the key when it is disposed substantially concentric with the keyhole but is normally disposed eccentrically thereto, due to the weight of the magnet, with the portion of the plate above the opening in a position blocking passage of the key. Magnet 62 is chosen to have a magnetic force of attraction to the magnetic material in the key such that it does not overcome the force of spring 70 with the result that the front end of the key passes gate 66. Magnet 64, on the other hand, is chosen to have a magnetic force of attraction to the key material such that the magnet is lifted against the pull of gravity to locate opening 74 in gate 72 substantially concentrically of the keyhole and the key may then pass. It is understood, of course, that if a key, even though of proper configuration but not containing the proper concentration of magnetic material is used, the gates 66 and 72 will not be properly influenced and the key will be blocked from passing. For instance, if there is too much magnetically responsive material in the key, magnet 62 will be pulled down against the bias of spring 70 and gate 66 will block passage; if there is not enough magnetic material, the magnet 64 is not lifted and gate 72 remains in blocking position. The key must therefore be magnetically acceptable. Alternatively, the key could be made with magnetic shield material which, upon insertion of the key, serves to lessen the magnetic force or pull exerted upon key blocking gates biased to unblocking position but held therein by a permanent or electromagnet.

Figures 7, 8, 9:
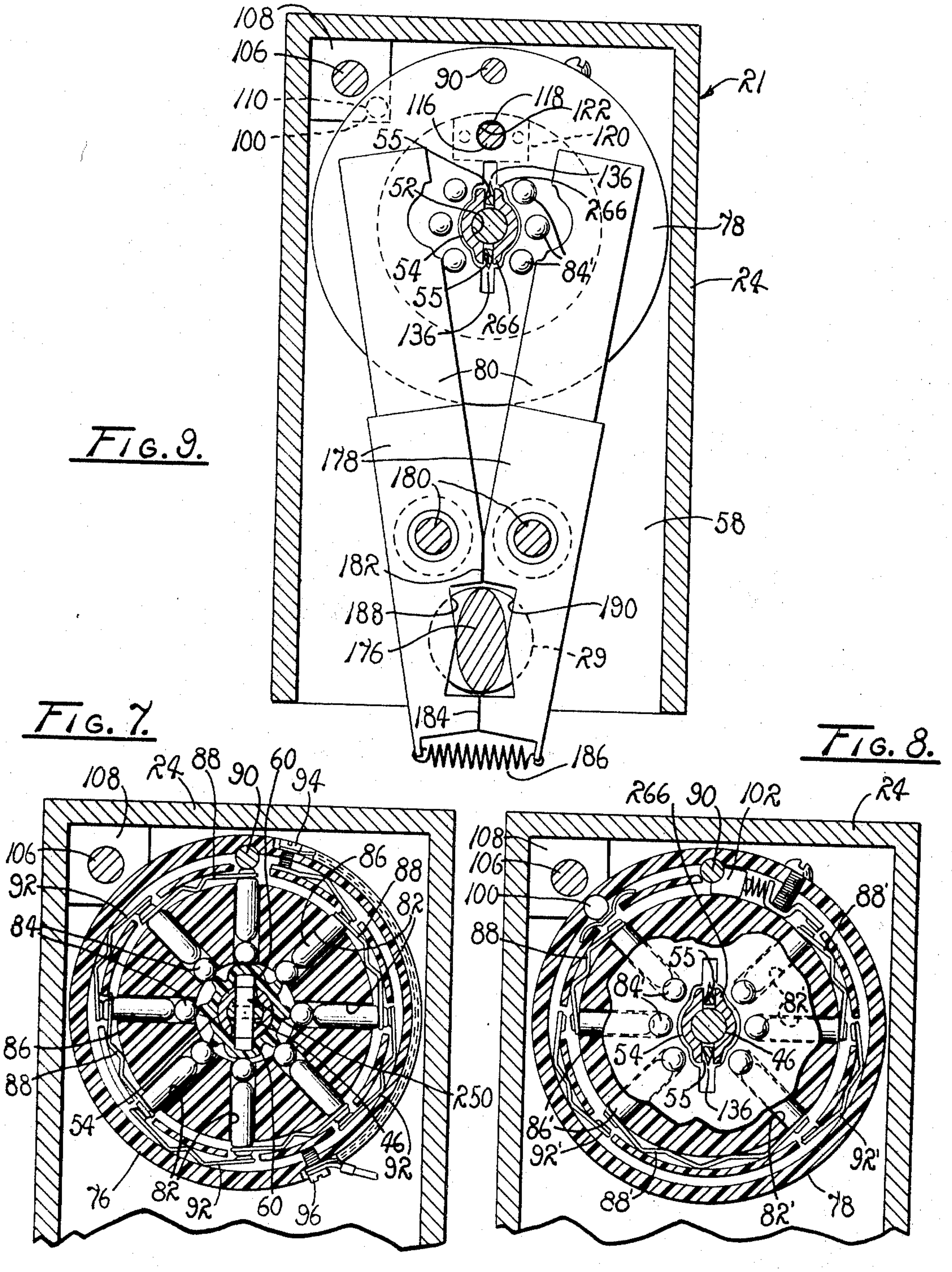
FIG. 7 is a sectional view taken generally along line 7—7 in FIG. 4 and showing one of the circuit control plates.
FIG. 8 is a sectional view taken generally along line 8—8 in FIG. 4 and showing the other circuit control plate.
FIG. 9 is a sectional view taken generally along line 9—9 in FIG. 4 and showing the key cutoff knives in open position.
Figure 17:
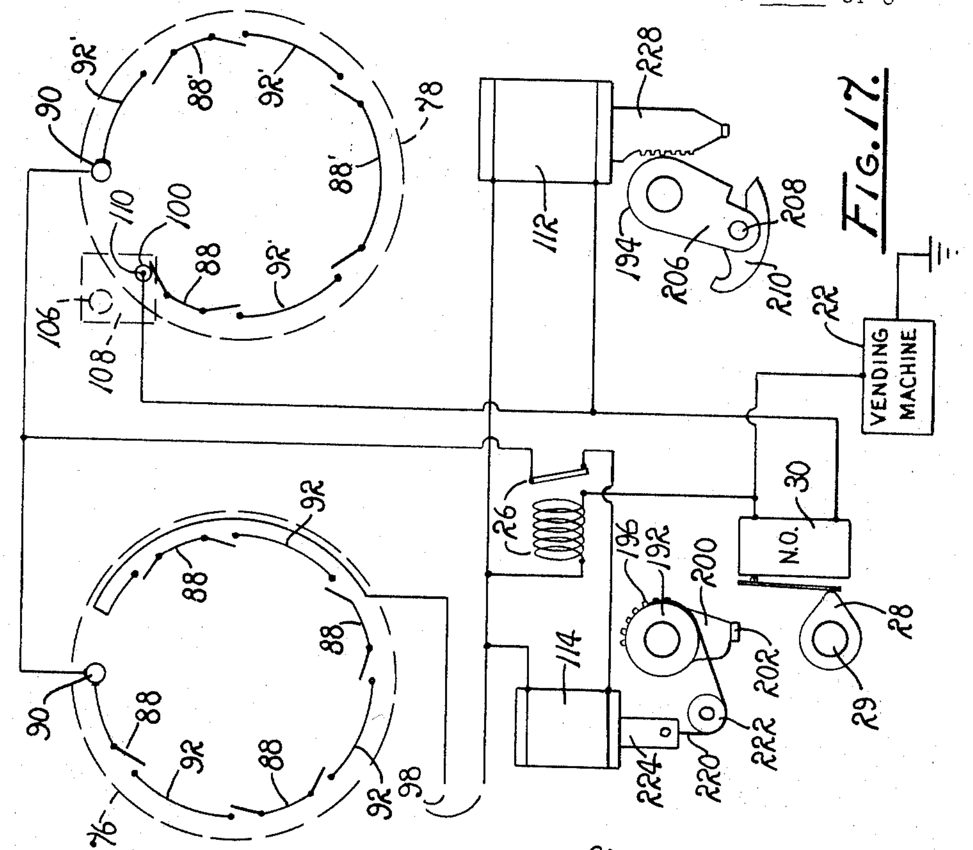
FIG. 17 is a schematic diagram showing the relation of the circuit plates to the actuation mechanisms and the vending machine.

Directing attention also to FIGS. 7, 8 and 9, the authenticity of the key is further tested by a pair of circuit control plates or members 76 and 78, of suitable insulating material, for example, phenolic or the like, plate 76 being fastened on the inner side of front panel 44 and plate 78 spaced a small distance therefrom to accommodate a pair of key cutoff blades 80 therebetween (FIGS. 4 and 9). Plate 76 is provided with a plurality of radially disposed bores 82, each containing or housing a force transmitting mechanism which may take the form of a steel ball 84 and a pusher or plunger 86 of insulating material, the radially inner end of the bore having means, known in the art, associated therewith for preventing the ball from departing. Bearing against each plunger 86 is a leaf spring contact 88, one, designated **88*a*, of a plurality of contacts 88, ordinarily being spaced from a copper conductor rod 90 connected to the relay 26, each of the other contacts 88 being spaced from a mating leaf spring contact 92. Pressure forcing the balls 84 outwardly is transmitted through the respective plungers 86 with the result that the contacts 88*a* and 88 engage the conductor rod 90 and contacts 92, respectively, to complete a series circuit extending from the relay 26 around to the last contact 92 which is electrically connected via a pair of posts 94 and 96 and wiring to a source of electrical potential 98** (FIG. 17).

Plate 78 is slidable on conductor rod 90 and is similarly provided with radial bores 82′, except that the inner end of each is laterally directed toward the front panel 44 (FIG. 6), balls 84′, pushers or plungers 86′ with contacts 88′ bearing thereagainst, and mating contacts 92′ opposite contacts 88′, except one contact **88′*a* which is opposite a contact 92′*a*. Contact 92′*a* is part of a contact terminal 100 facing rearwardly from the side of plate 78 adjacent its peripheral edge (FIG. 6). Outward pressure on plungers 86′ engages contacts 88′*a* and 88′ with contacts 92′*a* and 92′, respectively, to complete a series circuit around the plate to the last contact 92′ (FIG. 17) which, in turn, is connected to a spring-pressed copper brush or block 102 in contact with the conductor rod 90 to complete a series circuit from the source of potential 98 to the terminal contact 100**.

Best seen in FIGS. 4 and 5, the ends of rod 90 are coffed with insulators 104 and mounted in the endwalls 44 and 58 of the housing 24 parallel to a price setting screw or drive shaft 106 which is helically threaded and journaled for rotation in the endwalls, price setting control knob 32 being secured to the rear end thereof. Threaded to shaft 106 is a price setting block 108 of suitable insulating material, such as phenolic or the like, carrying a forwardly facing contact 110 which is in alignment with contact 100 on plate 78 (FIG. 9) and wired to switch 30 and an actuating solenoid 112 (FIG. 17), hereinafter referred to as the drive shaft solenoid. Turning knob 32 until pointer 36 is at the appropriate price indicia locates the contact 110 at such a distance that an appropriate length of the key 60, commensurate with the price set, is required to be inserted to push slidable plate 78 until the contact 100 carried thereby engages contact 110 for energizing drive shaft solenoid 112. A smaller and weaker solenoid 114, hereinafter referred to as the reset solenoid, is connected to the relay 26 (FIG. 17).

It will be appreciated that even though a key is admitted through the keyhole and passes the magnetic gates, unless the key is also of the specific configuration required to engage all balls 84 and 84′ and force all plungers 86 and 86′ outwardly, there will be a failure to complete the series circuits with the result that electrical current necessary for energizing the actuation device will be lacking. Therefore, a spurious key of different physical characteristics will not be successful in vending an item.

Member 78 is also slidable with respect to a binder rod or shaft 116 which is formed with a slight flat portion 118 and passes through a steel plate 120 having a noncircular opening 122 slidably fitted thereto, the plate being secured to the rear force of the member. Thus, the turning of rod 116 binds member 78 against further movement, the rod being journaled in endwall 58 and in a collar or disk 124 fixed to the rear portion of the mandrel 54, the disk providing a stationary base for a coil spring 126 reacting against plate 78. Collar 124 also provides a base for a coil spring 128 which reacts against a thrust cam collar 130 slidably surrounding the mandrel 54 and having diametrically opposed projections or tangs 132 disposed in slots 55 of the mandrel. Collar 124 is diametrically slotted, as at 134, to receive a pair of key slitter knives or blades 136, disposed in the mandrel slots 55, and a pair of hooked springs 138, each having a finger 140 engaging in a notch in a slitter blade 136, respectively, and secured to the thrust cam collar 130 for retaining the blades in the mandrel slots and exerting bias thereon. Blades 136 have rounded butt ends bearing against collar 130 and front ends tapered, as at 142, on the inner edges thereof to provide camming surfaces engageable with a cylindrical cam 144 disposed transversely of the mandrel. Thus, forward movement of blades cams them outwardly and they slice through or slit a key on the mandrel.

Slidable thrust cam collar 130 is in engagement with a thrust cam collar 146 rotatably mounted on mandrel 54 and bearing against rear endwall 58, each of the collars having an annular wavy cam surface 148, whereby rotation of collar 146 slides collar 130 and blades 136 along the mandrel for camming the blades outwardly to perform a key slicing action.

Figures 12, 13, 14:
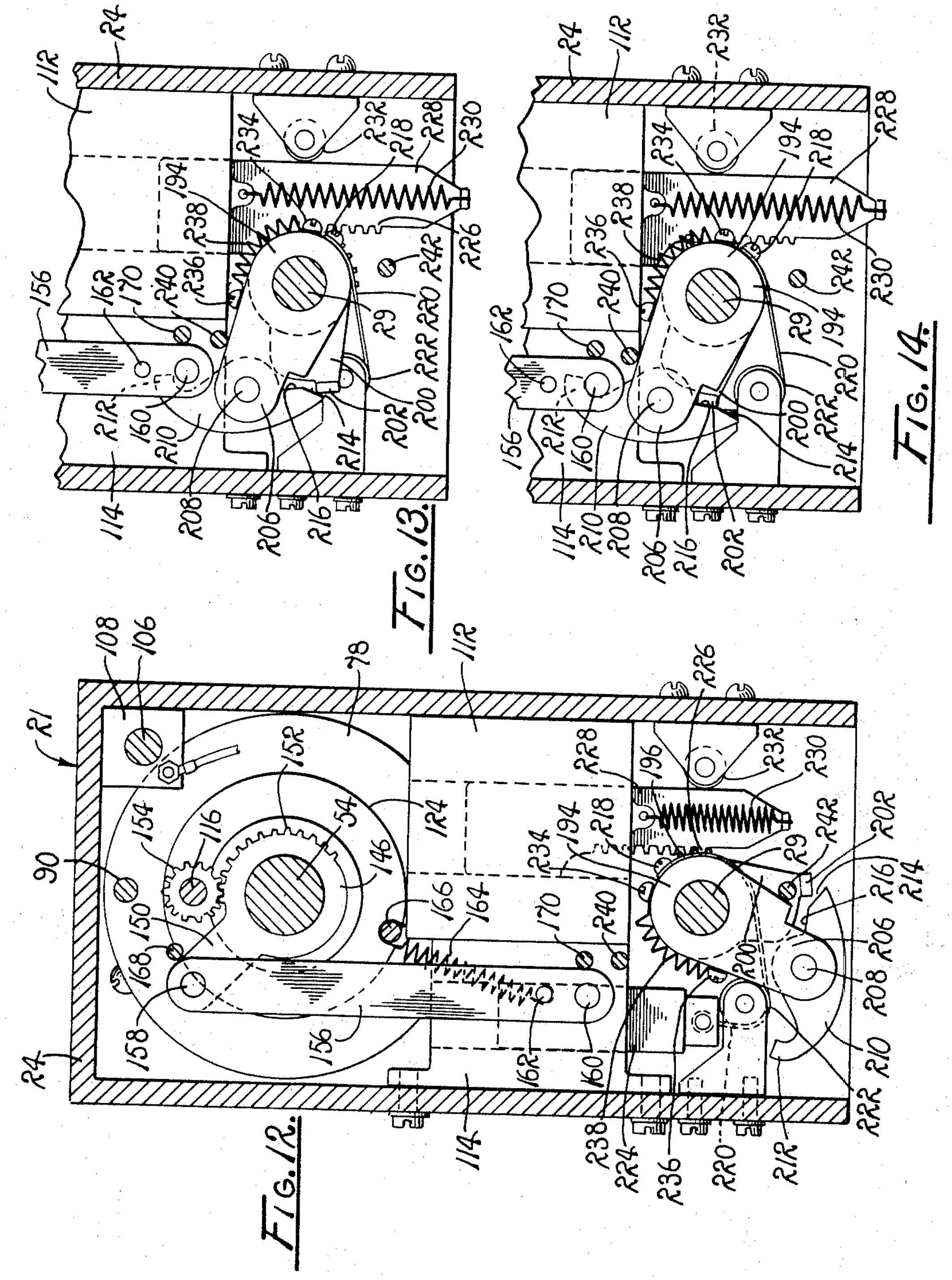
FIG. 12 is a sectional view taken generally along line 12—12 of FIG. 4 and showing the relationship of the actuation mechanisms and linkage.
FIGS. 13, 14 and 15 are fragmentary views of the lower portion of FIG. 12 showing actuation mechanisms and linkage in different positions.

Viewing FIG. 12, it will be noted that collar 146 is provided with an arm 150 and gear teeth 152 meshing with the teeth of a gear 154 connected to the binder shaft 116. The end of arm 150 is received between a pair of elongated links 156 and pivoted thereto, as at 158, the links being held in spaced-apart, parallel relation by connected pins 160 and 162 at the lower end thereof (FIG. 4.) A tension spring 164 is connected between pin 162 and a pin 166 anchored in rear wall 58 and serves to bias the arm and links upwardly against stop pins 168 and 170, respectively, both secured in the rear wall.

Noting FIGS. 4 and 9, housing 24 has an open bottom, adjacent to which drive shaft 29 is journaled for rotation in the housing endwalls, as at 172 and 174, with cam 28 adjustably mounted on the rear end thereof, and is formed with an elliptical cam portion 176 generally in the plane of the key cutoff knives or blades 80. Each blade 80 has the lower portion thereof provided with a reinforcing support 178 journaled for rotation on a bearing stud bolt 180 screwed into the front endwall 44, the supports being beveled, as at 182 and 184, and urged to the position shown in FIG. 9 by the bias of an interconnecting tension spring 186. The supports 178 furnish bearing strength and are notched, as at 188 and 190, to provide camming surfaces engaged by the elliptical cam portion 176, during rotation thereof, to swing the knives 80 to closed or key cutoff or severance position.

Figures 15, 16:
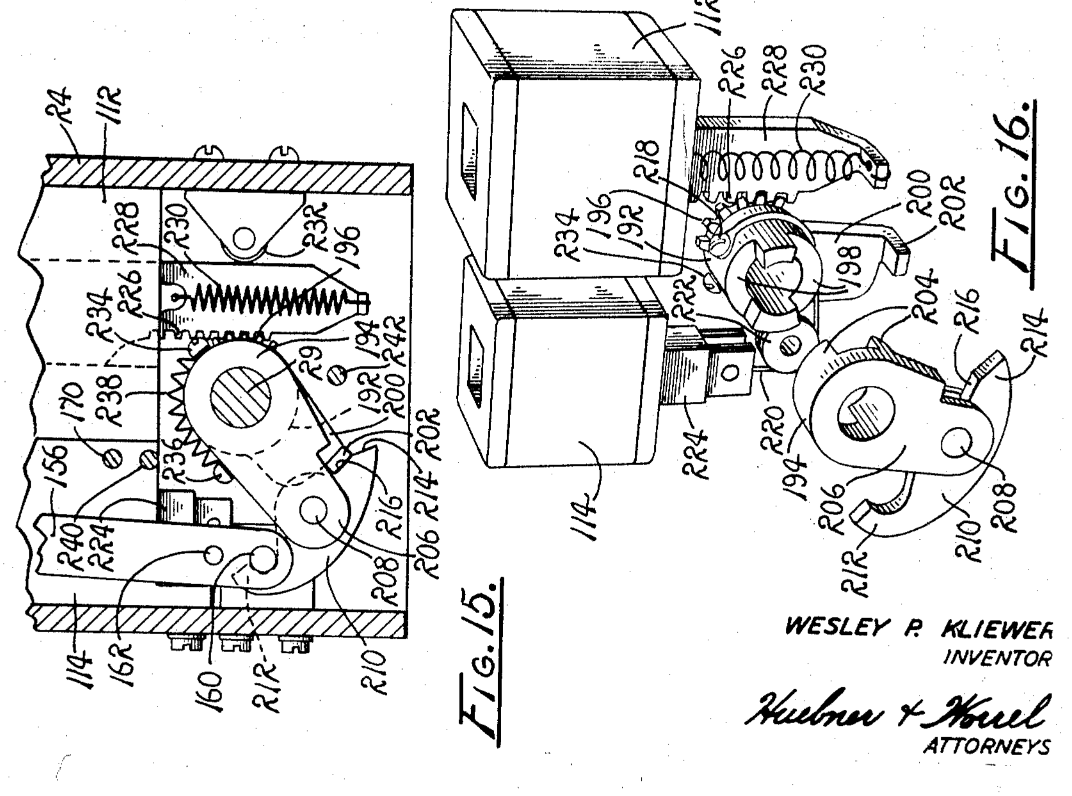
FIG. 16 is an exploded perspective view of the actuation mechanisms of FIG. 12.

Returning to FIG. 12 and referring also to FIGS. 4 and 16, a pair of collars 192 and 194 are mounted on shaft 29 adjacent rear endwall 58, the former fixed to the shaft and the latter journaled thereon. Collar 192 is formed with gear teeth 196 and a pair of elongated arcuate notches 198, and has an arm 200 rigid therewith which is provided with a laterally projecting latch pin or finger 202. Collar 194 is formed with a pair of arcuate projections or tangs 204 received in the notches 198, but of lesser circumferential extent for the purpose of providing lost motion between the collars 192 and 194. Collar 194 also has an arm 206 rigid therewith which is formed with a bifurcated end receiving and pivotally mounting, by a pin 208, a latch lever 210 having a latching finger 212 and a heel portion 214 engageable with an abutment or shoulder 216 on the arm. Secured to collar 192, as at 218, is one end of a tension transmitting element 220, such as a cable or the like, which is wrapped around the major portion of the collar circumference, passes around an idler pulley 222 mounted on a sidewall, and has its other end connected to the armature or plunger 224 of reset solenoid 114. Gear teeth 196 on collar 192 mesh with teeth on a rack 226, formed on the armature or plunger 228 of drive shaft solenoid 112 and having an upward-pulling tension spring 230 connected thereto, a rollar 232 (FIG. 12) mounted on a sidewall engaging the back of the plunger to maintain the gear teeth and rack in proper engagement. Connected to the collars 192 and 194, as at 234 and 236, respectively, is a tension spring 238, the bias of which urges the arm 206 to swing away from arm 200 a distance, determined by the amount of lost motion between the collars, and separates the latch pin or finger 202 from the latch lever 210.

Reset solenoid 114 is connected to the conductor rod 90 through the normally closed points of the relay 26 and it is energized the moment the series circuit of plate 76 is completed by a proper key (FIG. 17). This exerts a pull on cable 220 and rotates shaft 29 a quarter turn, causing the following sequence: (1) arms 200 and 206 are swung, the latter separated from the former until it engages a stop pin 240 projecting from rear wall 58, FIG. 13, after which latch pin 202 enters between the heel portion 214 of latch lever 210 and the shoulder 216 on arm 206 to pivot the lever and lock latching finger 212 over connecting pin 160 at the lower end of links 156, FIG. 14; (2) the plunger 228 of the drive shaft solenoid 112 is pulled into driving position against the bias of spring 230; and (3) the elliptical cam 176 is turned from its normal position with the long axis thereof horizontal, and the knives 80 in closed position, to a position where the long axis is vertical and the knives are pulled to open position by spring 186, FIG. 9.

This arrangement assures that the latch lever 210 remains locked to linkage 156 only so long as the energized reset solenoid 114 exerts pressure through latch pin 202 to overcome the separating action of spring 238. It is thus impossible to place the device in reset condition, wherein knives 80 are out of blocking position, by partial insertion and withdrawal of a key.

With the knives 80 out of the way, further insertion of a proper key pushes against slidable circuit control plate 78 to complete the series circuit thereof and engage contact 100 thereon with contact 110 on price setting block 108 for energizing the drive shaft solenoid 112 and driving its plunger 228 upwardly to counterrotate shaft 29 a quarter turn against the continuing pull of the smaller and far weaker reset solenoid 114. This turns elliptical cam 176 a quarter turn so that its long axis is horizontal and cutoff knives 80 are cammed to cut through the key circumferentially for severing the portion thereof beyond the knives. Simultaneously, linkage 156 is pulled down and thrust cam 146 is rotated, which binds plate 78 and cams the slidable thrust collar 130 and the slitter blades 136 away from the rear endwall 58 causing the slitter blades 136 to be cammed outwardly and slice longitudinally through the portion of the key on the mandrel 54 beyond the cutoff knives 80, the cut halves of the key then falling away from the mandrel.

Near the end of the counterrotation drive of shaft 29, FIG. 15, the arm 206 engages a stop pin 242 in endwall 58 which arrests its movement, continuing movement of arm 200 withdrawing latch pin 202 from between shoulder 216 and heel portion 214, which permits latch lever 210 to pivot and latching finger 212 to release its lock on pin 160 of linkage 156. Cam 28 is adjusted on shaft 29 so it closes the normally open switch 30 just as arm 206 reaches stop pin 242 in order to utilize power momentarily available from contact 110 via the circuits of plates 76 and 78 before the cut key portions drop off the mandrel and the slidable plate 78 starts its return under the influence of spring 126. This power is used to energize the vending machine 22 and the coil of relay 26, the former to dispense the item purchased, the latter to transfer continuing power from the circuit of plate 76 to the relay coil form the reset solenoid 114, thereby inactivating the solenoid and breaking the circuit to it until the unspent portion of the key is retrieved by the customer.

In the meantime, spring 164 pulls upwardly on the released links to effect return thereof to starting position, and thrust cam 146 and binder rod 116 too, such return being slowed by the inertia inherent in a large gear driving a smaller one, and springs 126 and 128 effect return, in due course, of the movable parts associated therewith. After retrieval of the unspent portion of the key, the actuation device is again in condition to receive an authentic key of sufficient length and actuate a vending machine.

With the arrangement described, the knives 80 serve as sturdy key blocking plates when in the normally closed position. This prevents damage to the device that might otherwise result if power failed and a customer unknowingly applied extra key pressure against slidable circuit control plate 78 in a mistaken effort to effect delivery. It is also important that knives 80 remain in blocking position at all times that a proper key is not inserted. This insures against unauthorized experimental probing with wires and other objects which might harm the device or jam the keyhole against legitimate keys. The cutoff knives 80 thus perform the triple role of spent key severance, device protection and prevention of substitute key use.

It is to be noted that the cutoff knives 80 are spaced inwardly of the keyhole entrance 42 and that there may be times when there is a length of unspent key sufficient to purchase the item to be dispensed yet insertion to effect such purchase would place the end of the key inwardly of the keyhole entrance. In such case, a mechanism, earlier referred to, is provided for pushing the key portion in and retracting any remnant remaining after the purchase. Directing attention to FIGS. 5, 6, 7, 10 and 11, the mechanism includes, in addition to the slidable shaft 46 and knob 48, a bladed member 250 formed with a semidisk-like body 252 from which a pair of oppositely directed blades 254 extend, each having the general shape of a wedge and a knife edge 256 disposed in the plane of one of the sides of the body, respectively (FIG. 11). Shaft 46 is suitably slotted to receive the bladed member 250 which is connected thereto by a pin 258 passing through apertures (not referenced by numeral) in the shaft and a perforation 260 in the bladed member, the mandrel 54 having an access opening 262 in the side thereof for admission of the pin. Slots 55 at the forward end of the mandrel are closed off by interconnecting webs 264 (FIGS. 5 and 6) and are enlarged slightly on the side adjacent a knife edge 256, as at 266 (FIGS. 7 and 10), to permit limited rotation of the bladed member 250, the forward travel of which is determined by the webs engaging the front face thereof.

In the use of the pusher and retractor mechanism, a customer pushes a key into the keyhole entrance 42 as far as the front panel 44 conveniently permits and, if delivery of the item is not effected, he pulls the key pusher knob 48 all the way out, turns the knob clockwise, exerting slight torque or pressure so the oppositely directed knife edges 256 gouge or bite into the inside of the key, and pushes forward on the knob until the vending machine has delivered the item. Should this fail to effect delivery, the customer may, by exerting slight clockwise pressure and pulling on knob 48, retrieve the key portion or leave it in and follow it with sufficient length from another key to complete the purchase.

*Operation of the first form*

The operation of the first form of the actuation device of the present invention is believed to be clearly apparent and is briefly summarized at this point. Assuming an authentic or legitimate key is inserted into keyhole 42, the position of magnet 62 is not affected but magnet 64 is attracted upwardly, moving gate 72 out of key blocking position. The key next pushes balls 84 to effect closing of the series circuit of plate 76 for completing a circuit through the relay 26 and energizing reset solenoid 114 (FIG. 17). Pull of the armature 224 of the reset solenoid on cable 220 rotates shaft 29 a quarter turn which results in the movement of arm 200 swinging arm 206 upwardly and forcing latch pin 202 between shoulder 216 on arm 206 and heel portion 214 of latch lever 210 to lock latching finger 212 over pin 160 on linkage 156 (FIGS. 14 and 16); the armature 228 of drive shaft solenoid 112 being pulled down against the bias of spring 230; and the elliptical cam 176 being turned so its long axis is vertical which releases knives 80 to move to open position under the influence of tension spring 186 (FIG. 9). Further insertion of the key pushes balls 84′ for closing the series circuit of plate 78 and sliding the plate along conductor rod 90 until contact 100 on the plate engages contact 110 on the price setting block 108 to complete the circuit to the drive shaft solenoid 112, energizing the same. This pulls armature 228 upwardly, against the pull of the weaker reset solenoid 114, and counterrotates shaft 29 a quarter turn which results in linkage 156 being pulled down (FIG. 15), swinging arm 150 and rotating thrust cam collar 146 and gear 154 which causes binder shaft 116 to bind plate 78 in position and cam 146 to slide the collar 130 and cam the slitter blades 136 outwardly to slice the portion of the key beyond the cutoff knives 80 into two longitudinal halves (FIGS. 5 and 12), the knives 80 simultaneously being cammed by elliptical cam 176 and cutting across the key. Just prior to key cutoff, cam 28 closes switch 30 and power, only momentarily available through the closed circuits of plates 76 and 78 until the cut key halves drop away and plate 78 slides back, is routed to the vending machine and to the coil of relay 26 (FIG. 17), thereby switching continuing power, coming via the closed circuit of plate 76, to the relay coil from the reset solenoid 114, thus de-energizing the solenoid and breaking its circuit. Simultaneously, arm 206 is stopped by pin 242, further movement of arm 200 withdrawing pin 202 from engagement with latch lever 210 and permitting it to pivot and release latching finger 212 from linkage 156 which starts its upward return under the influence of spring 164. With the return of thrust cam 146, plate 78 is unbound and the plate and slidable thrust cam 130 return to starting positions under the influence of springs 126 and 128, respectively. With the unspent portion of the key removed, the actuation device is once again in condition to accept the remaining portion of the key or another legitimate key.

*Second form*

Figure 18:
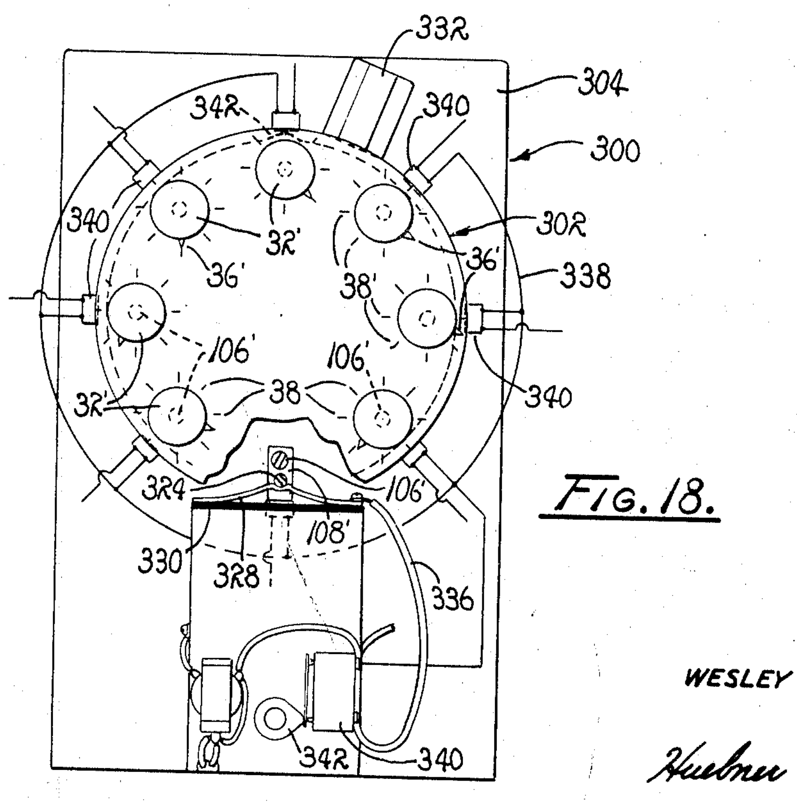
FIG. 18 is a rear elevation of a modified form of an actuation device by which a vending machine may be controlled to dispense any one of several items selected by a customer.
Figure 20:
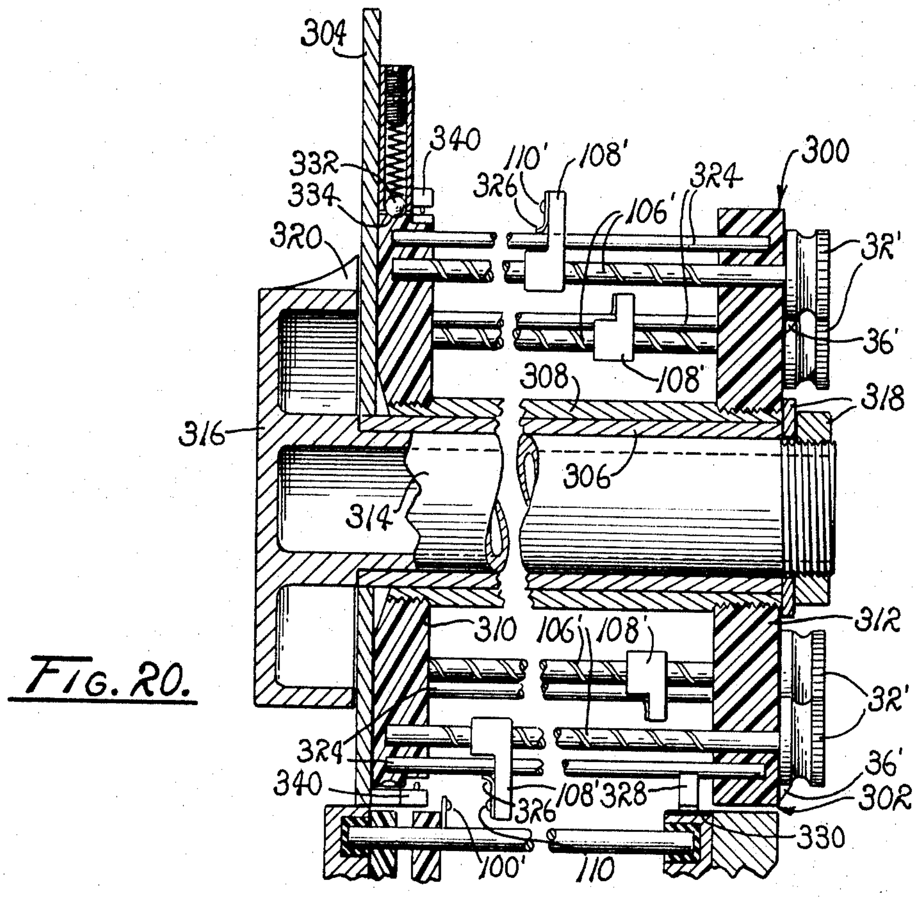
FIG. 20 is a foreshortened sectional view taken generally along line 20—20 of FIG. 19 and offset at the top in order to show the spring-pressed ball mechanism for indexing the selector drum.
Figure 19:
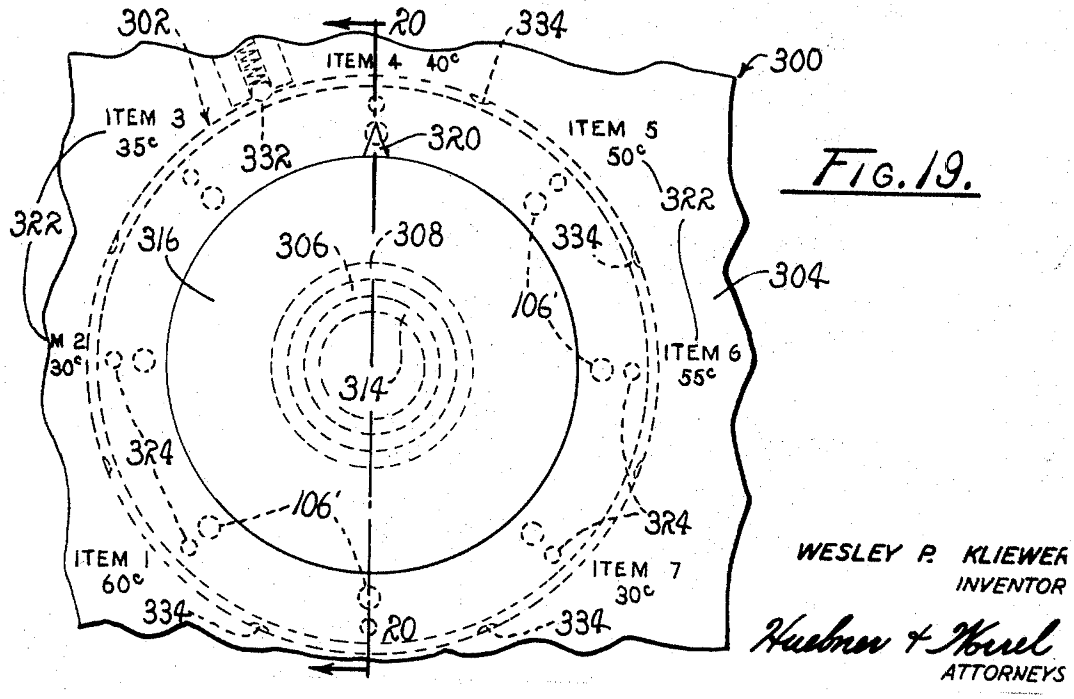
FIG. 19 is a fragmentary frontal view showing the item selection dial and item identification indicia.

FIGS. 18 through 20 illustrate a modified form of actuation device, designated generally by reference numeral 300, which is operable to control any one of a plurality of vending machines (not shown) to dispense any one of several items (goods or services) selected by the customer. Device 300 incorporates substantially all the mechanisms of the actuation device 21 hereinbefore described, and only the differences pertinent to a clear understanding of the modified form will be pointed out. Accordingly, the portion of FIG. 18 designated by reference numeral 21′ is to be considered to include all components of the actuation device 21 described in connection with FIGS. 1 through 17 except for the top wall of housing 24, contact 100, price setting screw shaft 106, block 108, contact 110 and the price setting controls 32, 34, 36, 38 and 40, which are essentially replaced with a price setting control drum 302 operable to set various prices for a multiplicity of items.

Referring to FIGS. 19 and 20, it will be noted that drum 302 is mounted on a front wall or panel 304 which is suitably supported on wall 44, the drum having a plurality of price setting blocks 108′, each threaded to a price setting screw shaft 106′ and carrying a contact 110′ adapted to be disposed in alignment with a contact 100′ carried by circuit control plate 78 which is slidable on conductor rod 90 from a position adjacent circuit control plate 76 to a position where the contacts engage. Contact 100′ is disposed above rod 90 and is electrically connected to contact 100. It is understood, of course, that drum 302 could be so mounted that contact 110′ is in alignment with contact 100. However, the former is preferred for symmetry.

Fixed to the front panel 304 is a tubular bearing 306 and journaled thereabout is a tubular body 308 which has connected thereto front and rear endwalls 310 and 312, respectively, both of suitable insulation material, such as phenolic or the like. Journaled within tubular bearing 306 is a hollow shaft 314 which is provided with a finger knob 316 at its front end and is connected at its rear end to the read end of body 308 by a nut and interlocking washer combination 318. Price setting screw shafts 106′ are journaled for rotation in the endwalls 310 and 312, parallel to shaft 314 and conductor rod 90, and each is provided on the rear end thereof with a price setting finger knob 32′ which has a pointer 36′ and is settable with respect to calibrated price indicia 38′ on endwall 312. Knob 316 has a pointer 320 settable with respect to indicia 322 on front panel 304, the indicia being correlated to the prices set and identifying the items and the price of each.

Each price setting block 108′ is made of a suitable insulating material, for example, phenolic or the like, and has passing therethrough a conductor rod or bar 324 against which a copper leaf spring trolley 326, connected to contact 110′ and carried by the block, maintains contact. Setting of finger knob 316 at the indicia identifying the desired item engages one of the conductor rods with a copper leaf spring contact 328 suitably mounted on an insulator 330, of phenolic or the like, and electrically connected to the drive shaft solenoid 112 and switch 30. Proper positioning of the drum to assure proper contact between the conductor rod 324 and contact 328 is achieved by indexing the drum through the use of a spring pressed ball mechanism 332 and notches 334 in wall 310.

A lead 336 from switch 30 goes to a line 338 common to one side of each of a plurality of normally open microswitches 340, equal in number to the conductor rods 324 and correlated thereto. Each of the microswitches has a vending machine connected to its other side and a cam 342 is provided on wall 310 for closing the microswitch which is correlated with the conductor rod in engagement with contact 328 so that the proper vending machine is actuated to dispense the item selected when a legitimate key has been inserted in device 21′ the amount required by the price of the item.

*Operation of the second form*

Summarizing the operation of the modified form of actuation device 300, the customer turns knob 316 until pointer 320 points to the item it is desired to purchase. This automatically brings the proper conductor rod 324 into engagement with spring contact 328 and closes the microswitch 340 correlated therewith. As described in connection with actuation device 21, sufficient insertion of a legitimate key 60 completes the series circuits of plates 76 and 78, energizes the reset solenoid 114 and pushes contact 100′ into engagement with contact 110′, which energizes the drive shaft solenoid 112 effecting severance and slicing of the key and camming switch 30 to closing position for actuating the vending machine connected to the closed microswitch.

There have thus been provided actuation devices which are responsive to the sufficient insertion of a legitimate key and are adapted to use any remnant of the key toward purchase of an item, but are non-responsive to non-legitimate key or other unauthorized objects so as to be substantially tamper-proof, and in one form thereof operable to control any one of a plurality of vending machines for dispensing an item selected from among several available.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus. For example, while the key configuration has been shown as a complete circle, it need not be, nor need it be circular in shape. The key can be virtually flat with only enough "lip" on one or both sides to stay on the mandrel until delivery is effected.

Having described my invention, what I claim as new and desire to secure by Letters Patent is:

1. A actuation device controllable by an elongated key having a predetermined cross-sectional configuration throughout its length comprising a housing having an entrance opening adapted to receive the predetermined configuration of said key; means inwardly of said entrance opening responsive to insertion of a sufficient amount of the length of said key for locating the inward end of the key at a predetermined distance from said entrance opening, and means in said housing operable from outside the housing to insert said key with the outward end thereof inwardly of the entrance opening when its length is less than said predetermined distance.

2. The device of claim 1 wherein said first-named means includes key alteration means inwardly of the entrance opening, and said last-named means are operable after alteration of the key to retrieve any portion of the key disposed between the key alteration means and the entrance opening.

3. The device of claim 1 wherein said first-named means includes key alteration means blocking insertion of all objects but said key.

4. The device of claim 3 wherein said blocking means includes key cutoff blades.

5. The device of claim 4 wherein said key cutoff blades are disposed in blocking position when said first-named means is in an at rest condition, and said first-named means is initially responsive to partial insertion of said key for moving said cutoff blades out of blocking position for further insertion of the key.

6. The device of claim 1 wherein said key possesses magnetic characteristics, and said first-named means includes magnetic means responsive to partial insertion of said key for moving key blocking means out of the way.

7. The device of claim 6 wherein said first-named means comprises means for altering said key including additional key blocking means.

8. The device of claim 1 wherein said last-named means comprises means extending outwardly through said entrance opening.

9. The device of claim 1 wherein said last-named means comprises a slidable shaft disposed in said entrance opening having a knob thereon externally of said opening and connected to a member engageable with said key inwardly thereof.

10. The device of claim 9 wherein said member is provided with oppositely directed blades and is responsive to torque applied to said knob for engaging said blades with said key.

11. A device controllable by an elongated key of uniform end-to-end cross-section for energizing a vending machine comprising, in combination entrance means for receiving said key to make a purchase of an item vended; key alteration means including key cutoff means associated with said entrance means blocking further insertion of all objects but said key; means responsive to initial insertion of said key for moving said key cutoff means for further insertion of said key; and means responsive to insertion of a sufficient amount of the length of said key for operating said key alteration means and providing an actuation signal energizing said vending machine.

12. The device of claim 11 wherein said means responsive to initial insertion of said key comprises a series circuit normally open but closed by said initial insertion of said key and electrical means energizable by completion of said series circuit.

13. The device of claim 12 wherein said means responsive to insertion of a sufficient amount of the length of said key comprises another normally open series circuit in series with said first-named series circuit and closed by said sufficient insertion of said key for energizing other electrical means.

14. The device of claim 13 further comprising a rotatable shaft; said first-named electrical means rotating said shaft in one direction and moving said key cutoff means to open position, and said second-named electrical means counterrotating said shaft for moving said key cutoff means to closed position for effecting cutoff of the key and placing said key cutoff means in blocking position.

15. The device of claim 11 wherein operable means are connected to said key alteration means, means carried by said shaft are connectable to said operable means for operation of said key alteration means, and said key alteration means includes key slitter blades cammable to slitting position upon operation thereof.

16. The device of claim 11 wherein said insertion of a sufficient amount of the length of said key disposes the front end thereof predetermined distances from said key cutoff means and said entrance means, said device further comprises means engageable with said key for advancing the same toward making a purchase when the length thereof with full insertion is less than the distance to said key cutoff means, whereupon it may be followed by another key of like configuration to complete the purchase, and said means engageable with said key is also operable to retract any remainder when the length thereof with full insertion disposes the rear end thereof between said key cutoff means and said entrance means and to retract said key when the length thereof with full insertion is insufficient to make a purchase; whereby all parts of a key may eventually be spent toward the purchase of items vended.

17. The device of claim 11 wherein said key alteration means also includes operating means and cammable key slitter blades mounted on a mandrel in alignment with said entrance means, said means responsive to initial insertion of said key includes a first series circuit closed by said insertion for energizing a first solenoid which rotates a drive shaft connected to the operating means of said key alteration means for moving said key cutoff means out of blocking position and preparing said key alteration means for subsequent key alteration action, and said means responsive to insertion of a sufficient amount of said key includes a second series circuit mounted for sliding on a conductor rod and carrying a contact in alignment with a contact on an adjustable price setting block, said second series circuit being in series with said first series circuit, said sufficient insertion of said key serving to close said series circuit and slide it so said contacts engage for energizing a second solenoid which operates against the action of said first solenoid to counterrotate said drive shaft for operating said operating means of said key alteration means and effecting key alteration action.

18. The device of claim 17 wherein said operating means for said key alteration means includes thrust cams and linkage connected thereto and arms mounted on said drive shaft carrying latch means connectable to said linkage during rotation of the drive shaft and exerting force on said linkage during counterrotation thereof.

19. The device of claim 18 wherein one of said arms is journaled on said drive shaft with said latch means pivotally mounted thereon, the other of said arms is fixed to said drive shaft and carries a latch pin for pivoting said latch means into connection with said linkage, and spring and lost motion means interconnect said arms.

20. The device of claim 17 wherein said price setting block is one of a plurality thereof mounted in a rotatable drum positionable to dispose any one of said blocks with the contact thereof in alignment with the contact on said second series circuit, a like plurality of switches disposed about said drum, each correlated with a price setting block and connected to an item vending machine, and means for rotating said drum and selectively positioning it to dispose one of said blocks in operative relation to said series circuit contact and simultaneously closing the switch correlated thereto; whereby said actuation signal energizes a vending machine in accordance with the item selected.

21. A multiple price setting mechanism for providing a customer with a variety of vended items to select from and usable with an actuation device for controlling a plurality of vending machines comprising, in combination a drum rotatably mounted in operative relation to said actuation device; a plurality of conductor bars mounted in said drum parallel to the axis of rotation thereof and each slidably supporting a price setting contact block; a contact carried by each block electrically connected to the respective bar thereof, a like plurality of price setting screw shafts journaled in said drum parallel to said bars and each threaded to one of said blocks, respectively; a price setting finger knob secured to each screw shaft for turning said shaft and setting the associated block at the desired price setting; a like plurality of switches disposed about said drum, each correlated with a block, one side of each of said switches connected to a common line, the other side thereof connected to a vending machine, respectively; and means for turning said drum having a pointer settable with respect to item identifying and price indicia, and means operable by setting said pointer opposite one of said indicia for electrically connecting one of said bars to said actuation device and closing the correlated switch to one of said vending machines.

References Cited

UNITED STATES PATENTS

| | | | |
|---|---|---|---|
| 3,204,741 | 9/1965 | Maxwell et al. | 194—4 |
| 3,249,194 | 5/1966 | Bass | 194—4 |
| 3,338,365 | 8/1967 | Hoffberger et al. | 194—4 |

STANLEY H. TOLLBERG, *Primary Examiner.*